United States Patent Office 3,737,455
Patented June 5, 1973

3,737,455
SUBSTITUTED 1-(LOWERALKYL-SULFINYLBENZ-YLIDENE)-3-INDENYLOXYACETIC ACID AND ESTERS THEREOF
Tsung-Ying Shen, Westfield, Howard Jones, Holmdel, and Michael W. Fordice, Cranford, N.J., assignors to Merck & Co., Inc., Rahway, N.J.
No Drawing. Filed Jan. 21, 1971, Ser. No. 108,631
Int. Cl. C07c 147/14
U.S. Cl. 260—520   7 Claims

ABSTRACT OF THE DISCLOSURE

New substituted indene acids and non-toxic pharmaceutically acceptable amides, esters and salts derived therefrom. The substituted indene acids disclosed herein have anti-inflammatory, anti-pyretic and analgesic activity. Also included herein are methods of preparing said indene acid compounds, pharmaceutical compositions having said indene acid compounds as an active ingredient and methods of treating inflammation by administering these particular compositions to patients.

---

This invention relates to new substituted indenyl acid compounds and processes for producing the same. More specifically, this invention relates to compounds having the following general formula:

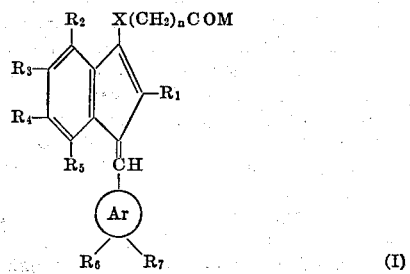

wherein X is alkenylene, O, S or —NR, wherein R can be hydrogen, alkyl, aryl, or arylalkyl;
n is 1 or 2;
$R_1$ is hydrogen, alkyl, haloalkyl, alkenyl or alkynyl;
$R_2$, $R_3$, $R_4$ and $R_5$ each may be hydrogen, alkyl, acyloxy, alkoxy, nitro, amino, acylamino, alkylamino, dialkylamino, dialkylaminoalkyl, sulfamyl, alkylthio, mercapto, hydroxy, hydroxyalkyl, alkylsulfonyl, halogen, cyano, carboxyl, carboalkoxy, carbamido, haloalkyl, cycloalkyl, cycloalkoxy, alkenyloxy, acyl, alkenyl or alkynyl;

Ar
is aryl or heteroaryl;
$R_7$ is alkylsulfinyl or alkylsulfonyl;
$R_6$ is hydrogen, halogen, hydroxy, alkoxy or haloalkyl; and
M is hydroxy, loweralkoxy, substituted loweralkoxy, amino, alkylamino, dialkylamino, N-morpholino, hydroxyalkylamino, polyhydroxyalkylamino, dialkylaminoalkylamino, aminoalkylamino or OMe in which Me is a cation.

The indene nucleus may be substituted in the 1-position by an aryl ring system such as benzene, naphthalene or biphenyl or a heteroaryl ring system such as a pyrrole, furan, thiophene, pyridine, imidazole, pyrazine, thiazole, etc. which contains an alkylsulfinyl or alkylsulfonyl substituent and may be further substituted with a halogen (chloro, fluoro or bromo), hydroxy, alkoxy (methoxy, ethoxy, propoxy, etc.) or haloalkyl (fluoromethyl, chloroethyl, trifluoromethyl, etc.) group.
Representative compounds of this invention are as follows:

5,6-difluoro-2-methyl-1-(4'-methylsulfinylbenzylidene)-3-indenyloxyacetic acid
5-fluoro-2-methyl-1-(4'-methylsulfinylbenzylidene)-3-indenyloxyacetic acid
5-chloro-2-methyl-1-(4'-methylsulfinylbenzylidene)-3-indenyloxyacetic acid
5,6-difluoro-2-methyl-1-(4'-methylsulfinylbenzylidene)-3-indenylthioacetic acid
5-fluoro-2-methyl-1-(4'-methylsulfinylbenzylidene)-3-idenylthioacetic acid
5-allyloxy-2-methyl-1-(4'-methylsulfinylbenzylidene)-3-indenylthioacetic acid
5-dimethylamino-2-methyl-1-(4'-methylsulfinylbenzylidene)-3-indenylthioacetic acid
N-[5,6-difluoro-2-methyl-1-(4'-methylsulfinylbenzylidene)-3-indenyl]-N-methylglycine
N-[5-fluoro-2-methyl-1-(4'-methylsulfinylbenzylidene)-3-idenyl]-N-methylglycine
N-[5,6-difluoro-2-methyl-1-(4'-methylsulfinylbenzylidene)-3-indenyl]-glycine and the corresponding amides, esters and pharmaceutically acceptable salts thereof.

It should be noted that the compounds of this invention may be isomerized into their cis and trans isomers by procedures well known in the art. It should be further noted that the cis isomer of the compounds of this invention is substantially more active than the trans isomer. Accordingly, it is to be understood that reference throughout the specification and appended claims to the compounds of this invention is intended to encompass not merely the compounds per se but includes their geometric isomers (cis, trans).

It should be further noted by one skilled in the art that the alkylsulfinyl derivatives of this invention are racemic mixtures of optically active enantiomorphs which may be resolved into their (+) and (—) forms by techniques well known in the art.

One skilled in the art should further note that some of the compounds of this invention are polymorphic and have different crystalline structures, melting points and solubility characteristics.

This invention also relates to a method of treating pain, fever or inflammation in patients using a compound of Formula I, particularly an especially preferred compound as the active constituent.

The compounds of the instant invention can be used to treat inflammation by reducing inflammation and relieving pain in such diseases as rheumatoid arthritis, osteoarthritis, gout, infectious arthritis and rheumatic fever.

The compounds of Formula I also have anti-pyretic and analgesic activity and would be administered and used in the same manner and in the same dosage ranges as if they were being used to treat inflammation as discussed further on.

The treatment of inflammation in accordance with the method of the present invention is accomplished by topically, orally, rectally or parenterally administering to patients a composition of a compound of Formula I, particularly the especially preferred compounds in a non-toxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, Cab-O-Sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such materials are cocoa butter and polyethylene glycol. Gels and lotions for topical application may be prepared in conventional manners.

The active compounds of Formula I and of the compositions of this invention are administered in an amount sufficient to treat inflammation, that is to reduce inflammation. Advantageously, the compositions will contain the active ingredient, namely, the compounds of Formula I in an amount of from about 0.1 mg. to 50 mg. per kg. body weight per day (5 mg. to 3.5 g. per patient per day), preferably from about 1 mg. to 15 mg./kg. body weight per day (50 mg. to 1 g. per patient per day).

The method of treatment of this invention comprises administering to a patient (animal or human) a compound of Formula I, particularly an especially preferred compound admixed with a non-toxic pharmaceutical carrier such as exemplified above. The compounds of Formula I and particularly the especially preferred compounds will be administered in an amount of from 0.1 mg. to 50 mg./kg. body weight per day, preferably from about 1 mg. to about 15 mg. per kilogram body weight per day. The most rapid and effective anti-inflammatory effect is obtained from oral administration of a daily dosage of from about 1 to 15 mg./kg. per day. It should be understood, however, that although preferred dosage ranges are given the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

In the preparation of the indenyloxy acid compounds of this invention, the starting material is an indane-1,3-dione which is prepared by the reaction of a dimethyl phthalate with an alkyl propionate. The indane-1,3-dione is reacted with ethylene glycol and a benzyl-magnesium halide to produce the corresponding 3-benzylidene-1-indanone which is converted to the corresponding indenyl-oxyacetate (or other ester) in dimethoxyethane. This indenyloxyacetate is then converted to the free acid.

The indenylthio acid compounds of this invention are prepared by the reaction of a 3-benzylidene-1-indanone with thionyl chloride followed by reaction with a thioglycolate while the glycine derivatives are prepared by the reaction of a 3-benzylidene-1-indanone derivative with thionyl chloride, followed by reaction with a glycine.

Although the syntheses described produce esters of the acids of this invention, some desired esters are more easily obtained by forming a simple ester of the final acid, hydrolyzing to the free acid and re-esterifying. The simple loweralkyl or benzyl esters are usually the ones used in the synthesis of the compounds. Other esters are more desirable from the standpoint of therapeutic utility of the compounds, such as the methoxymethyl, diethylaminoethyl, dimethylaminoethyl, dimethylaminopropyl, diethylaminopropyl, N - pyrollidinylethyl, N - piperidinylethyl, N-morpholinylethyl, N-ethyl-2-piperidinylethyl, N-pyrollidinylmethyl, N-methyl-2-pyrollidinylmethyl, 4-methyl-1-piperazinylethyl, methoxyethyl, ethoxyethyl and the like. These are mostly prepared from the corresponding alcohol and the indenyl acid.

The amides, both the simple amide and the substituted amides, are similarly prepared from the indenyl acids and the corresponding amines. Especially useful therapeutically are the morpholide, the bis(hydroxyethyl)amide and the like.

Similarly, salts are obtained by neutralizing the indenyl acids with bases or by metathesis of other salts. Especially useful are the metallic salts such as the alkali metal or alkaline earth salts and the amine and quaternary ammonium salts, which are water soluble, but the heavy metal salts such as iron, aluminum, etc. are also useful for some purposes.

The following examples are presented to further illustrate the invention:

EXAMPLE 1

(A) 5,6-difluoro-2-methylindane-1,3-dione

To dimethyl-4,5-difluorophthalate (230.17 g., 1.0 mole) and ethyl propionate (153.2 g., 1.55 moles) is added sodium (27.6 g., 1.2 moles). The mixture is slowly heated to boiling and refluxed for 4 hours. The mixture is cooled to room temperature and slurried with sodium hydroxide (1 N, 1 liter), filtered, and washed with water. The residue is taken up in ether-2 N sulfuric acid, the ether layer washed with water, saturated salt solution, dried ($MgSO_4$), concentrated and distilled to yield 5,6-difluoro-2-methylindane-1,3-dione.

(B) 5,6-difluoro-3,3-ethylenedioxy-2-methyl-1-indanone

The indanedione (137.3 g., 0.7 mole) from Example 1–A, ethylene glycol (43.3 g., 0.7 mole), benzene (500 ml.) and p-toluenesulfonic acid (200 g.) are refluxed until the theoretical volume of water is removed by means of a Dean-Stark separator. The mixture is cooled to 0°, ice (50 g.) added and neutralized with 5% sodium bicarbonate solution. The layers are separated, the water layer washed with benzene, the benzene extract dried ($MgSO_4$) and concentrated. The concentrate is distilled in vacuo to yield 5,6-difluoro-3,3-ethylenedioxy-2-methyl-1-indanone.

Using the reaction conditions and techniques of Example 1, Parts A and B, the following phthalates are converted to indanones. The phthalates form unsymmetrical diones, each of which forms two ethylene dioxy compounds. These two compounds are separated by chromatography on alumina columns which give approximately equimolar amounts of the 5- and 6-isomers.

| Starting material | Product A | Product B |
| --- | --- | --- |
| Dimethyl-4-fluoro-phthalate. | 5-fluoro-2-methyl-indane-1,3-dione. | 5-fluoro and 6-fluoro-3,3-ethylenedioxy-2-methyl-1-indanone. |
| Dimethyl-4-fluoro-5-methoxyphthalate. | 5-methoxy-6-fluoro-2-methylindane-1,3-dione. | 5-methoxy-6-fluoro- and 5-fluoro-6-methoxy-3,3-ethylenedioxy-2-methyl-1-indanone. |
| Dimethyl-4-cyano-phthalate. | 5-cyano-2-methyl-indane-1,3-dione. | 5-cyano- and 6-cyano-3,3-ethylenedioxy-2-methyl-1-indanone. |
| Dimethyl-4-allyloxy-phthalate. | 5-allyloxy-2-methyl-indane-1,3-dione. | 5-allyloxy and 6-allyloxy-3,3-ethylenedioxy-2-methyl-1-indanone. |
| Dimethyl-4-chloro-phthalate. | 5-chloro-2-methyl-indane-1,3-dione. | 5-chloro and 6-chloro-3,3-ethylenedioxy-2-methyl-1-indanone. |

(C) Cis- and trans-5,6-difluoro-3,3-ethylenedioxy-2-methyl-1-(4'-methylthiobenzylidene)-indene A solution of 4-methylthiobenzylmagnesium bromide is prepared from 4-methylthiobenzylbromide (108.6 g., 0.5 mole) in ether (1 liter) by the recycling procedure of Rowlands et al. [Grignard Reactions of Nonmetallic Substances, Mr. Kharasch and O. Reinmuth, Prentice Hall, 1954, pp. 23–24]. This is added dropwise to a rapidly stirred solution of 5,6-difluoro-3,3-ethylenedioxy-2-methyl-1-indanone (120.1 g., 0.5 mole) from Example 1–B in ether (2 liters) at 0° at such a rate that the Gilman test for free Grignard Reagent is never positive. At the end of the addition period the mixture is warmed to 20–25° and maintained for 2 hours. The mixture is cooled to 5–10°, quenched with 700 ml. of saturated ammonium chloride, filtered, the ethereal solution washed with water, saturated sodium chloride solution and dried (MgSO₄). The ethereal mixture is concentrated to 1500 ml., pyridine (150 ml.) is added, the mixture cooled to −10°, and thionyl chloride (71.4 g., 0.6 mole) is added dropwise with stirring. After the addition is completed the mixture is allowed to warm spontaneously to room temperature and poured into water and ice (2 kg.). After thorough mixing the layers are separated, the ether layer is washed with water, dried (MgSO₄), and concentrated in atmospheric pressure, then in vacuo. The residue is chromatographed on silica gel and eluted with methanolic chloroform to obtain cis- and trans-5,6-difluoro-3,3-ethylenedioxy - 2 - methyl-1-(4'-methylthiobenzylidene)-indane and these individually recrystallized from ethyl acetate-n-hexane.

(D) Cis-5,6-difluoro-2-methyl-3-(4'-methylthiobenzylidene)-1-indanone

The cis- ketal (108.7 g., 0.3 mole) of Example 1–C in 75% acetic acid (2 liters) is heated for 20 minutes on the steam bath. The mixture is concentrated in vacuo to ca. one-fourth of the original volume and the concentrate diluted with an equal volume of water and extracted with ethyl acetate (3× 750 ml.). The ethyl acetate extract is extracted with water, 5% sodium carbonate solution, water and saturated salt solution. The ethyl acetate extract is dried (MgSO₄) and concentrated to dryness in vacuo. The residue is crystallized from acetone-n-hexane to yield cis-5,6-difluoro-2-methyl-3-(4'-methylthiobenzylidene)-1-indanone.

(E) Ethyl-cis-5,6-difluoro-2-methyl-1-(4'-methylthiobenzylidene)-3-indenyloxyacetate To a mixture of indanone (73.3 g., 0.2 mole) from Example 1–D in dimethoxyethane (733 ml.) is added gradually with stirring at 10–15° an oil-free suspension of sodium hydride (4.8 g., 0.2 mole). When hydrogen evolution is complete, ethyl bromoacetate (33.4 g., 0.2 mole) is added dropwise with stirring at 15–20°. The mixture is slowly warmed to 60° with stirring and maintained thus for 2 hours. The mixture is cooled to 20°, cautiously diluted with water (750 ml.) and extracted with benzene (3× 1 liter). The benzene extract is washed with water, saturated salt solution, dried (MgSO₄), and concentrated to dryness in vacuo. The residue is crystallized and recrystallized from ethyl acetate-n-hexane to yield ethyl-cis-5,6-difluoro - 2 - methyl-1-(4'-methylthiobenzylidene)-3-indenyloxyacetate.

(F) Cis-5,6-difluoro-2-methyl-1-(4'-methylthiobenzylidene)-3-indenyloxyacetic acid A mixture of ethyl-cis-5,6-difluoro-2-methyl-1-(4'-methylthiobenzylidene)-3-indenyloxyacetate (39.0 g., 0.1 mole) and sodium hydroxide (1 N, 300 ml.) is heated at reflux under nitrogen with stirring for 2 hours. The mixture is cooled, diluted with water and acidified with 50% acetic acid. The mixture is filtered, the precipitate washed with water and dried in air at 25°. The residue is recrystallized from acetone-n-hexane to yield cis-5,6-difluoro-2-methyl-1-(4' - methylthiobenzylidene)-3-indenyloxyacetic acid.

(G) Cis-5,6-difluoro-2-methyl-1-(4'-methylsulfinylbenzylidene)-3-indenyloxyacetic acid Sodium metaperiodate trihydrate (11.3 g., 0.0422 mole) in water (85 ml.) is added to cis-5,6-difluoro-2-methyl-1-(4'-methylthiobenzylidene)-3-indenyloxyacetic acid (3.74 g., 0.01 mole) in methanol (240 ml.) and acetone (10 ml.) at room temperature. The mixture is stirred overnight after which only a trace of starting material remains and only a trace of sulfone has formed. The mixture is concentrated to small volume, diluted with water and filtered. The precipitate is washed well with water, dried in air, then in vacuo at 50° and recrystallized from ethyl acetate-n-hexane to yield cis-5,6-difluoro-2-methyl-1-(4'-methylsulfinylbenzylidene)-3-indenyloxyacetic acid.

Using the reaction conditions and techniques of Example 1, Parts C through G, the following indenyloxy acetic acids are prepared:

| Starting material | Product |
| --- | --- |
| 5-fluoro and 6-fluoro-3,3-ethylenedioxy-2-methyl-1-indanone. | Cis-5-fluoro and 6-fluoro-2-methyl-1-(4'-methylsulfinylbenzylidene)-3-indenyloxyacetic acid. |
| 5-methoxy-6-fluoro- and 5-fluoro-6-methoxy-3,3-ethylenedioxy-2-methyl-1-indanone. | Cis-5-methoxy-6-fluoro and 5-fluoro-6-methoxy-2-methyl-1-(4'-methylsulfinylbenzylidene)-3-indenyloxyacetic acid. |
| 5-cyano and 6-cyano-3,3-ethylenedioxy-2-methyl-1-indanone. | Cis-5-cyano and 6-cyano-2-methyl-1-(4'-methylsulfinylbenzylidene)-3-indenyloxyacetic acid. |
| 5-allyloxy and 6-allyloxy-3,3-ethylenedioxy-2-methyl-1-indanone. | Cis-5-allyloxy and 6-allyloxy-2-methyl-1-(4'-methylsulfinylbenzylidene)-3-indenyloxyacetic acid. |
| 5-chloro and 6-chloro-3,3-ethylenedioxy-2-methyl-1-indanone. | Cis-5-chloro and 6-chloro-2-methyl-1-(4'-methylsulfinylbenzylidene)-3-indenyloxyacetic acid. |

EXAMPLE 2

Trans-5,6-difluoro-2-methyl-1(4'-methylsulfinylbenzylidene)-3-indenyloxyacetic acid When trans-5,6-difluoro-3,3-ethylenedioxy-2-methyl-1-(4'-methylthiobenzylidene)-indane (36.2 g., 0.1 mole) is treated by the methods of Examples 1–D through 1–G, trans-5,6-difluoro - 2 - methyl-1-(4'-methylsulfinylbenzylidene)-3-indenyloxyacetic acid is obtained.

EXAMPLE 3

(A) Cis-3-chloro-5,6-difluoro-2-methyl-1-(4'-methylthiobenzylidene)-indene

To cis-5,6-difluoro - 2 - methyl-3-(4'-methylthiobenzylidene)-1-indanone (73.3 g., 0.2 mole) in benzene (250 ml.) is aded thionyl chloride (29.7 g., 0.25 mole) in benzene (100 ml.). The mixture is slowly warmed to reflux with stirring and refluxed for 2 hours. The mixture is cooled to 20° and poured into ice and water (1 kg.). The layers are separated, the benzene layer washed with water and saturated salt solution, dried (MgSO₄), and concentrated to dryness in vacuo. The residue is crystallized from ethyl acetate-n-hexane to yield cis-3-chloro-5,6-difluoro-2-methyl-1-(4'-methylthiobenzylidene)-indene.

(B) Cis-3-chloro-5,6-difluoro-2-methyl-1-(4'-methylsulfinylbenzylidene)-indene

The product (3.35 g., 0.01 mole) of Example 3–A by the method of Example 1–G is converted to cis-3-chloro-5,6-difluoro-2-methyl-1-(4' - methylsulfinylbenzylidene)-indene.

(C) Cis-5,6-difluoro-2-methyl-1-(4'-methylsulfinylbenzylidene)-3-indenylthioacetic acid To methyl thioglycolate (0.212 g., 0.002 mole) in absolute methanol (20 ml.) is added sodium methoxide (0.108 g., 0.002 mole) and the mixture is concentrated to dryness in vacuo. The residue is slurried with dimethoxyethane (20 ml.) and to this cis-3-chloro-5,6-difluoro-2-methyl-1-(4'-methylsulfinylbenzylidene)-indene (0.701 g., 0.002 mole) is added. With stirring the mixture is warmed to reflux over 30 minutes and maintained at reflux for 4 hours. The mixture is taken to dryness in vacuo, diluted with sodium hydroxide (0.1 N, 30 ml.) and again heated at reflux for 1 hour. The mixture is cooled to 20°, acidified with concentrated hydrochloric acid and filtered. The residue is dried in air and crystallized from acetone-n-hexane to yield cis-5,6-difluoro-2-methyl-1-(4'-methylsulfinylbenzylidene)-3-indenylthioacetic acid.

Using the reaction conditions and techniques of Examples 3–A, 3–B and 3–C, the following indenylthioacetic acids are obtained:

| Starting material | Product |
| --- | --- |
| Cis-5 or 6-fluoro-2-methyl-3-(4'-methylthiobenzylidene)-1-indanone. | Cis-5 or 6-fluoro-2-methyl-1-(4'-methylsulfinylbenzylidene)-3-indenylthioacetic acid. |
| Cis-5 or 6-cyano-2-methyl-3-(4'-methylthiobenzylidene)-1-indanone. | Cis-5 or 6-cyano-2-methyl-1-(4'-methylsulfinylbenzylidene)-3-indenylthioacetic acid. |
| Cis-5 or 6-allyloxy-2-methyl-3-(4'-methylthiobenzylidene)-1-indanone. | Cis-5 or 6-allyloxy-2-methyl-1-(4'-methylsulfinylbenzylidene)-3-indenylthioacetic acid. |
| Cis-5 or 6-dimethylamino-2-methyl-3-(4'-methylthiobenzylidene)-1-indanone. | Cis-5 or 6-dimethylamino-2-methyl-1-(4'-methylsulfinyl benzylidene)-3-indenylthioacetic acid |

EXAMPLE 4

Cis-5,6-difluoro-2-methyl-1-(4'-methylsulfinylbenzylidene)-3-indenyl-β-thiopropionic acid By use of methyl β-mercaptopropionate (24.0 g., 0.002 mole) in the method of Example 3–C with cis-3-chloro-5,6 - difluoro - 2-methyl-1-(4-methylsulfinylbenzylidene)-indene (0.701 g., 0.002 mole), cis-5,6-difluoro-2-methyl-1 - (4' - methylsulfinylbenzylidene)-3-indenyl-β-thiopropionic acid is obtained.

EXAMPLE 5

N-[cis-5,6-difluoro-2-methyl-1-(4'-methylsulfinylbenzylidene)-3-indenyl]-N-methylglycine To methyl sarcosinate (0.206 g., 0.002 mole) in pyridine (20 ml.) is added cis-3-chloro-5,6-difluoro-2-methyl-1-(4'-methylsulfinylbenzylidene)-indene (0.701 g., 0.002 mole). The mixture is put under nitrogen and heated at reflux for 3 hours. The mixture is concentrated to dryness in vacuo, hydrochloric acid (6 N, 20 ml.) is added and the mixture refluxed for 4 hours. The mixture is again concentrated to dryness in vacuo, the residue is taken up in 2 N sodium hydroxide and extracted with benzene. The layers are separated, the aqueous phase extracted twice more with equal volumes of benzene. The aqueous phase is brought to pH 6 with hydrochloric acid and the mixture adsorbed on ion exchange resin (IR-120 on the $H_3^{\oplus} O$ 

cycle). The product is eluted from the resin with ammonium hydroxide (1 N), the eluate concentrated to dryness in vacuo and the residue crystallized from - iso propanol-water to yield N-[cis-5,6-difluoro-2-methyl-1-(4' - methylsulfinylbenzylidene) - 3 - indenyl]-N-methylglycine.

Using the reaction conditions and techniques of Example 5 the following compounds are obtained:

| Starting material | Product |
| --- | --- |
| Cis-3-chloro-5 or 6-fluoro-2-methyl-1-(4'-methylsulfinylbenzylidene)-indene. | N-[cis-5 or 6-fluoro-2-methyl-1-(4'-methylsulfinylbenzylidene)-3-indenyl]-N-methylglycine. |
| Cis-3-chloro-5 or 6-cyano-2-methyl-1-(4'-methylsulfinylbenzylidene)-indene. | N-[cis-5 or 6-cyano-2-methyl-1-(4'-methylsulfinylbenzylidene-3-indenyl]-N-methylglycine. |
| Cis-3-chloro-5 or 6-allyloxy-2-methyl-1-(4'-methylsulfinyl-benzylidene)-indene. | N-[cis-5 or 6-allyloxy-2-methyl-1-(4'-methylsulfinylbenzylidene)-3-indenyl]-N-methylglycine. |
| Cis-3-chloro-5 or 6-dimethylamino-2-methyl-1-(4'-methylsulfinyl-benzylidene)-indene. | N-[cis-5 or 6-dimethylamino-2-methyl-1-(4'-methylsulfinyl-benzylidene)-3-indenyl]N-methylglycine. |

EXAMPLE 6

(A) N - benbyl - N - [cis-5,6-difluoro-2-methyl-1-(4'-methylsulfinylbenzylidene)-3-indenyl]-glycine By the method of Example 5, N-benzylglycine, ethyl ester (0.387 g., 0.002 mole) is condensed with cis-3-chloro - 5,6 - difluoro - 2 - methyl-1-(4'-methylsulfinyl-benzylidene)-indene (0.701 g., 0.002 mole) to yield N-benzyl - N - [cis-5,6-difluoro-2-methyl-1-(4'-methylsulfinylbenzylidene)-3-indenyl]-glycine.

(B) N-[cis-5,6-difluoro-2-methyl-1-(4'-methylsulfinylbenzylidene)-3-indenyl]-glycine A solution of N-benzyl-N-[cis-5,6-difluoro-2-methyl-1-(4' - methylsulfinylbenzylidene-3-indenyl]-glycine (0.465 g., 0.001 mole) in acetic acid (20 ml.) is hydrogenated over 5% palladium on carbon (0.3 g.,) at room temperature (25°) and 45 p.s.i. pressure. The hydrogenation is stopped when the uptake is 0.001 mole. The catalyst is removed by filtration and the filtrate concentrated to yield N - [cis - 5,6 - difluoro - 2-methyl-1-(4'-methylsulfinylbenzylidene)-3-indenyl]-glycine.

Using the reaction conditions and techniques of Examples 6–A and 6–M, the following compounds are obtained.

| Starting material | Product 6-A | Product 6-B |
| --- | --- | --- |
| Cis-3-chloro-5 or 6-fluoro-2-methyl-1-(4'-methylsulfinylbenzylidene)-3-indene. | N-benzyl-N-[cis-5 or 6-fluoro-2-methyl-1-(4'-methylsulfinyl-benzylidene)-3-indenyl]-glycine. | N-[cis-5 or 6-fluoro-2-methyl-1-(4'-methyl sulfinylbenzylidene)-3-indenyl]-glycine. |
| Cis-3-chloro-5 or 6-methyl-1-(4'-methylsulfinylbenzylidene)-3-indene. | N-benzyl-N-[cis-5- or 6-cyano-2-methyl-1-(4'-methylsulfinyl-benzylidene)-3-indenyl]-glycine. | N-[cis-5 or 6-cyano-2-methyl-1-(4'-methyl 1-(4'-methylsulfinyl-benzylidene)-3-indenyl]-glycine. |
| Cis-3-chloro-5 or 6-allyloxy-2-methyl-1-(4'-methylsulfinyl-benzylidene)-3-indene. | N-benzyl-N-[cis-5- or 6-allyloxy-2-methyl-1-(4'-methylsulfinyl-benzylidene)-3-indenyl]-glycine. | N-[cis-5 or 6-allyloxy-2-methyl-1-(4-methylsulfinyl-benzylidene)-3-indenyl]-glycine. |
| Cis-3-chloro-5-or 6-di-methylamino-2-methyl-1-(4'-methyl-sulfinylbenzylidene)-3-indene. | N-benzyl-N-[cis-5 or 6-dimethylamino-2-methyl-1-(4'-methylsulfinyl-benzylidene)-3-indenyl]-glycine. | N-[cis-5 or 6-dimethyl-amino-2-methyl-1-(4'-methylsulfinyl-benzylidene)-3-indenyl]-glycine. |

EXAMPLE 7

(A) Ethyl cis-5,6-difluoro-2-methyl-1-(4'-methylthiobenzylidene)-3-indenyloxy-β-propionate By the method of Example 1–E cis - 5,6 - difluoro-2-methyl - 3 - (4' - methylthiobenzylidene) - 1 - indanone of Example 1–D is condensed with ethyl β-bromopropionate (36.2 g., 0.2 mole) to yield the subject compound.

(B) Cis-5,6-difluoro-2-methyl-1-(4'-methylsulfinylbenzylidene)-3-indenyloxy-β-propionic acid Ethyl cis - 5,6 - difluoro - 2 - methyl - 1 - (4'-methylthiobenzylidene - 3 - indenyloxy) - β - propionate (40.4 g., 0.1 mole) by the methods of Examples 6 and 7 is converted to the subject compound.

EXAMPLE 8

N-[cis-5,6-difluoro-2-methyl-1-(4'-methylsulfinylbenzylidene)-3-indenyl]-N-methyl-β-alanine Ethyl N - methyl - β - alanine (26.2 g., 0.002 mole) and cis - 3 - chloro - 5,6 - difluoro - 2 - methyl - 1 - (4'-methylsulfinylbenzylidene)-indene (0.701 g., 0.002 mole) are condensed by the method of Example 5 to yield the subject material.

Using the same reaction conditions and techniques, the following compounds are obtained:

| Starting material | Product |
| --- | --- |
| Cis-3-chloro-5 or 6-fluoro-2-methyl-1-(4'-methylsulfinylbenzylidene)-indene. | N-[cis-5 or 6-fluoro-2-methyl-1-(4'-methylsulfinylbenzylidene)-3-indenyl]-N-methyl-β-alanine. |
| Cis-3-chloro-5 or 6-cyano-2-methyl-1-(4'-methylsulfinylbenzylidene)-indene. | N-[cis-5 or 6-cyano-2-methyl-1-(4'-methylsulfinylbenzylidene)-3-indenyl]-N-methyl-β-alanine. |
| Cis-3-chloro-5 or 6-allyloxy-2-methyl-1-(4'-methylsulfinyl-benzylidene)-indene. | N-[cis-5 or 6-allyloxy-2-methyl-1-(4'methylsulfinylbenzylidene)-3-indenyl]-N-methyl-β-alanine. |
| Cis-3-chloro-5 or 6-dimethylamino-2-methyl-1-(4'-methylsulfinyl-benzylidene)-indene. | N-[cis-5 or 6-dimethylamino-2-methyl-1-(4'-methylsulfinyl-benzylidene)-3-indenyl]-N-methyl-β-alanine. |

EXAMPLE 9

(A) N-benzyl-N-[cis-5,6-difluoro-2-methyl-1-(4'-methylsulfinylbenzylidene)-3-indenyl]-β-alanine By the method of Example 5, N-benzyl-β-alanine, ethyl ester (0.414 g., 0.002 mole) is condensed with cis-3- chloro-5,6 - difluoro - 2 - methyl - 1 - (4'-methylsulfinylbenzylidene)-indene to yield the subject compound.

(B) N-[cis-5,6-difluoro-2-methyl-1-(4'-methylsulfinylbenzylidene)-3-indenyl]-β-alanine N - benzyl - N - [cis-5,6-difluoro-2-methyl-1-(4'-methylsulfinylbenzylidene) - 3 - indenyl] - β - alanine (0.001 mole) by the method of Example 6–B is converted to the subject compound.

| Starting material | Product A | Product B |
|---|---|---|
| Cis-3-chloro-5 or 6-fluoro-2-methyl-1-(4'-methylsulfinylbenzylidene)-indene. | N-benzyl-[cis-5 or 6-fluoro-2-methyl-1-(4'-methylsulfinylbenzylidene)-3-indenyl]-β-alanine. | N-[cis-5 or 6-fluoro-2-methyl-1-(4'-methylsulfinylbenzylidene)-3-indenyl]-β-alanine. |
| Cis-3-chloro-5 or 6-cyano-2-methyl-1-(4'-methylsulfinylbenzylidene)-indene. | N-benzyl-[cis-5 or 6-cyano-2-methyl-1-(4'-methylsulfinylbenzylidene)-3-indenyl]-β-alanine. | N-[cis-5 or 6-cyano-2-methyl-1-(4'-methylsulfinylbenzylidene)-3-indenyl]-β-alanine. |
| Cis-3-chloro-5 or 6-allyloxy-2-methyl-1-(4'-methylsulfinylbenzylidene)-indene. | N-benzyl-[cis-5 or 6-allyloxy-2-methyl-1-(4'-methylsulfinylbenzylidene)-3-indenyl]-β-alanine. | N-[cis-5 or 6-allyloxy-2-methyl-1-(4'-methylsulfinylbenzylidene)-3-indenyl]-β-alanine. |
| Cis-3-chloro-5 or 6-dimethylamino-2-methyl-1-(4'-methylsulfinylbenzylidene)-indene. | N-benzyl-[cis-5 or 6-dimethylamino-2-methyl-1-(4'-methylsulfinylbenzylidene)-3-indenyl]-β-alanine. | N-[cis-5 or 6-dimethylamino-2-methyl-1-(4'-methylsulfinylbenzylidene)-3-indenyl]-β-alanine. |

EXAMPLE 10

(A) 3-hydroxy-4-methylthiobenzaldehyde o-Hydroxythioanisole (0.35 mole) in methylene chloride (200 ml.) is added to anhydrous aluminum chloride (66.67 g., 0.5 mole). The mixture is stirred and cooled while dichloromethyl methyl ether is added dropwise. After the solution is completed, the mixture is stirred for 15 minutes at room temperature. The liquid phase is decanted into ice and water (300 g.) and the unreacted aluminum chloride is washed with methylene chloride until the washes are colorless. The washes and decanted material are combined. The layers are separated and the organic layer is washed with saturated potassium carbonate, dried (MgSO$_4$), and distilled to yield 3-hydroxy-4-methylthiobenzaldehyde.

(B) Cis- and trans-5,6-difluoro-3,3-ethylenedioxy-2-methyl-1-(3'-hydroxy-4'methylthiobenzylidene)-indane A solution of 3-hydroxy-4-methylthiobenzylmagnesium bromide is prepared from 3-hydroxy-4-methylthiobenzylbromide (0.5 mole) in ether (1 liter) by the recycling procedure of Rowlands et al. [Grignard Reactions of Nonmetallic Substances, M. Kharasch and O. Reinmuth, Prentice Hall, 1954, pp. 23–24]. This is added dropwise to a rapidly stirred solution of 5,6-difluoro-3,3-ethylenedioxy-2-methyl-1-indanone (120.1 g., 0.5 mole) from Example 1–B in ether (2 liters) at 0° at such a rate that the Gilman test for free Grignard Reagent is never positive. At the end of the addition period the mixture is warmed to 20–25° and maintained for 2 hours. The mixture is cooled to 5–10°, quenched with 700 ml. of saturated ammonium chloride, filtered, the ethereal solution washed with water, saturated sodium chloride solution and dried (MgSO$_4$). The ethereal mixture is concentrated to 1500 ml., pyridine (150 ml.) is added, the mixture cooled to −10°, and thionyl chloride (71.4 g., 0.6 mole) is added dropwise with stirring. After the addition is completed the mixture is allowed to warm spontaneously to room temperature and poured into water and ice (2 kg.). After thorough mixing the layers are separated, the ether layer is washed with water, dried (MgSO$_4$), and concentrated in atmospheric pressure, then in vacuo. The residue is chromatographed on silica gel and eluted with methanolic chloroform to obtain cis- and trans-5,6-difluoro-3,3-ethylene - 2 - methyl-1-(3'-hydroxy - 4' - methylthiobenzylidene)-indane and these individually recrystallized from ethyl acetate-n-hexane.

(C) Cis-5,6-difluoro-2-methyl-3-(3'-hydroxy-4'-methylthiobenzylidene)-1-indanone The cis ketal (0.3 mole) of Example 10–B in 75% acetic acid (2 liters) is heated for 20 minutes on the steam bath. The mixture is concentrated in vacuo to ca. one-fourth of the original volume and the concentrate diluted with an equal volume of water and extracted with ethyl acetate (3× 750 ml.). The ethyl acetate extract is extracted with water, 5% sodium carbonate solution, water and saturated salt solution. The ethyl acetate extract is dried (MgSO$_4$) and concentrated to dryness in vacuo. The residue is crystallized from acetone-n-hexane to yield cis-5,6-difluoro - 2 - methyl-3-(3'-hydroxy-4'-methylthiobenzylidene)-1-indanone.

(D) Ethyl cis-5,6-difluoro-2-methyl-1-(3'-hydroxy-4'-methylthiobenzylidene)-3-indenyloxyacetate To a mixture of indanone (0.2 mole) from Example 10–D in dimethoxyethane (733 ml.) is added gradually with stirring at 10–15° an oil-free suspension of sodium hydride (4.8 g., 0.2 mole). When hydrogen evolution is complete, ethyl bromoacetate (33.4 g., 0.2 mole) is added dropwise with stirring at 15–20°. The mixture is slowly warmed to 60° with stirring and maintained thus for 2 hours. The mixture is cooled to 20°, cautiously diluted with water (750 ml.) and extracted with benzene (3× 1 liter). The benzene extract is washed with water, saturated salt solution, dried (MgSO$_4$), and concentrated to dryness in vacuo. The residue is crystallized and recrystallized from ethyl acetate-n-hexane to yield ethyl cis-5,6-difluoro - 2 - methyl-1(3' - hydroxy-4'-methylthiobenzylidene)-3-indenyloxyacetate.

(E) Cis-5,6-difluoro-2-methyl-1-(3'-hydroxy-4'-methylthiobenzylidene)-3-indenyloxyacetic acid A mixture of ethyl cis-5,6-difluoro-2-methyl-1-(3'-hydroxy-4'-methylthiobenzylidene) - 3 - indenyloxyacetate (0.1 mole) and sodium hydroxide (1 N, 300 ml.) is heated at reflux under nitrogen with stirring for 2 hours. The mixture is cooled, diluted with water and acidified with 50% acetic acid. The mixture is filtered, the precipitate washed with water and dried in air at 25°. The residue is recrystallized from acetone-n-hexane to yield cis-5,6-difluoro - 2 - methyl-1-(3'-hydroxy-4'-methylthiobenzylidene)-3-indenyloxyacetic acid.

(F) Cis-5,6-difluoro-2-methyl-1-(3'-hydroxy-4'-methylsulfinylbenzylidene)-3-indenyloxyacetic acid Sodium metaperiodate trihydrate (11.3 g., 0.0422 mole) in water (85 ml.) is added to cis-5,6-difluoro-2-methyl-1-(3'-hydroxy - 4' - methylthiobenzylidene)-3-indenyloxyacetic acid (0.01 mole) in methanol (240 ml.) and acetone (10 ml.) at room temperature. The mixture is stirred overnight after which only a trace of starting material remains and only a trace of sulfone has formed. The mixture is concentrated to small volume, diluted with water and filtered. The precipitate is washed well with water, dried in air, then in vacuo at 50° and recrystallized from ethyl acetate-n-hexane to yield cis-5,6-difluoro-2-methyl-1(3'-hydroxy - 4' - methylsulfinylbenzylidene)-3-indenyloxyacetic acid.

Using the reaction conditions and techniques of Example 10, Steps A through F, when o-chlorothianisole, o-bromothioanisole and o - cyanothioanisole are used, there is obtained cis - 5,6 - difluoro - 2 - methyl - 1 - (3' - chloro - 4' - methylsulfinylbenzylidene) - 3 - indenyloxyacetic acid, cis - 5,6 - difluoro - 2 - methyl-1-(3'-bromo-4'-methylsulfinylbenzylidene) - 3 - indenyloxyacetic acid, and cis-5,6-difluoro-2-methyl-1-(3'-cyano-4'-methylsulfinylbenzylidene)-3-indenyloxyacetic acid, respectively.

EXAMPLE 11

(A) o-(β-hydroxyethoxy)-thioanisole o-Hydroxythioanisole (14.1 g., 0.1 mole) is dissolved in sodium ethoxide (6.8 g., 0.1 mole) in absolute ethanol (100 ml.) and stirred as β-hydroxyethylchloride (8.1 g., 0.1 mole) is added. The reaction mixture is refluxed for 2 hours and cooled. The o-(β-hydroxyethoxy)-thioanisole is extracted.

Using the same reaction conditions and techniques, when o-hydroxythioanisole is reacted with β-hydroxymethyl chloride, β-hydroxypropyl chloride or β-hydroxybutyl chloride, there is obtained o-(β-hydroxymethoxy)-thioanisole, o-(β-hydroxypropoxy)-thioanisole and o-(β-hydroxybutoxy)-thioanisole, respectively.

(B) Cis - 5 - fluoro - 2 - methyl - 1 - (3' - β - hydroxyethoxy - 4' - methylsulfinylbenzylidene) - 3 - indenyloxyacetic acid The product of Example 11–A is reacted by the methods of Examples 10–A, 10–B and 10–C to obtain cis-5-fluoro-2 - methyl - 1 - (3' - β - hydroxyethoxy - 4' - methylsulfinylbenzylidene)-3-indenyloxyacetic acid.

In this manner the other thioanisoles of Examples 11–A may be reacted to form the corresponding indenyloxy acetic acid.

EXAMPLE 12

(A) o-(β-chloroethoxy)-thioanisole o-(β-Hydroxyethoxy)-thioanisole (0.1 mole) is refluxed in excess thionyl chloride and evaporated to dryness to yield o-(β-chloroethoxy)-thioanisole.

In a like manner, other o-(β-hydroxyalkoxy)-thioanisoles may be refluxed with other thionyl halides to yield the appropriate o-(β-haloalkoxy)-thioanisole as, for example, o-(β-bromomethoxy)-thioanisole, o-(β-chloropropoxy)-thioanisole, or o-(β-bromobutoxy)-thioanisole.

(B) Cis - 5 - fluoro - 2 - methyl - 1 - (3' - β - chloroethoxy - 4' - methylsulfinylbenzylidene) - 3 - indenyloxyacetic acid The product of Example 12–A is reacted by the methods of Examples 10–A, 10–B and 10–C to obtain cis-5-fluoro-2-methyl - 1 - (3' - β - chloroehtoxy - 4' - methylsulfinylbenzylidene)-3-indenyloxyacetic acid.

In this manner the other thionanisoles of Example 12–A may be reacted to form the corresponding indenyloxyacetic acid.

EXAMPLE 13

(A) o-Ethoxythioanisole o-Chlorothioanisole (15.85 g., 0.1 mole) is stirred at reflux in nitrobenzene containing copper powder (100 mg.) and sodium ethoxide (6.8 g., 0.1 mole) for 2 hours. The product is steam distilled and the distillate dried and fractionally distilled under reduced pressure to yield o-ethoxothioanisole.

Using the same reaction conditions and techniques, when o-chlorothioanisole is reacted with sodium methoxide, sodium propoxide and sodium t-butoxide, there is obtained o-methoxythioanisole, o-propoxythioanisole and o-t-butoxythioanisole, respectively.

(B) Cis-5-fluoro-2-methyl-1-(3'-ethoxy-4'-methylsulfinylbenzylidene)-3-indenylacetic acid The product of Example 13–A is reacted by the methods of Examples 10–A, 10–B, and 10–C to obtain cis-5-fluoro - 2 - methyl - 1 - (3'-ethoxy-4'-methylsulfinylbenzylidene)-3-indenyloxyacetic acid.

In this manner the other thioanisoles of Example 13–A may be reacted to form the corresponding indenyloxyacetic acid.

EXAMPLE 14

Methyl cis-5-fluoro-2-methyl-1-(4'-methylsulfinylbenzylidene)-3-indenyloxyacetate Cis - 5 - fluoro - 2-methyl-1-(4'-methylsulfinylbenzylidene)-3-indenyloxyacetic acid (0.03 mole) is dissolved in methanol (50 ml.), concentrated sulfuric acid (1.0 ml.) is added and the mixture heated at reflux for 3 hours. The mixture is cooled, poured into ethyl acetate and extracted successively with saturated sodium bicarbonate, water and saturated salt solution. The ethyl acetate extract is dried (MgSO$_4$), concentrated to dryness and the residue crystallized from ethyl acetate-n-hexane.

EXAMPLE 15

Cis-5-fluoro-2-methyl-1-(3'-fluoro-4'-methylsulfinylbenzylidene)-3-indenylthioacetamide Cis - 5 - fluoro - 2 - methyl-1-(3'-fluoro-4'-methylsulfinylbenzylidene)-3-indenylthioacetic acid (0.01 mole) is warmed with thionyl chloride (5 ml.) for 25 minutes. The mixture is cooled to 25° and poured with stirring into ice-cold concentrated ammonia solution. The precipitated amide is washed with water, dried and recrystallized from methanol-water to yield cis-5-fluoro-3-methyl-1-(3'-fluoro - 4' - methylsulfinylbenzylidene) - 3 - indenylthioacetamide.

Similarly, when ammonia is replaced by an equivalent amount of the following amines, the corresponding amides are obtained.

Morpholine
Dimethylamine
Ethanolamine
Benzylamine
N,N-diethylethylenediamine
Benzylglycinate
Piperidine
Pyrrolidine
N-methylpiperazine
N-phenylpiperazine
N-hydroxyethylpiperazine
Piperazine
Diethylamine
Diethanolamine
Aniline
p-Ethoxyaniline
p-Chloroaniline
p-Fluoroaniline
p-Trifluoromethylaniline
Butylamine
Cyclohexylamine
Methylamine
D-glucosamine
Tetra-o-acetyl-d-glucosamine
D-galactosylamine
D-mannosylamine
N,N-dimethylglycine amide
N,N-dibutylglycine amide
N-methyl-2-aminomethylpiperidine
N-methyl-2-aminomethylpyrrolidine
β-Ethoxyethylamine
Di(β-ethoxyethyl)amine
β-Phenethylamine
α-Phenethylamine
Dibenzylamine
D-mannosamine

EXAMPLE 16 t-Butyl cis-5-fluoro-2-methyl-1-(4'-methylsulfinylbenzylidene)-3-indenyloxyacetate Cis - 5 - fluoro - 2 - methyl-1-(4'-methylsulfinylbenzylidene)-3-indenyloxyacetic acid (0.01 mole) is added to isobutylene (30 ml.) and concentrated sulfuric acid (0.1 ml.). The mixture is stoppered securely and shaken at 25° for 18 hours, chilled to 0° and the whole poured into a separatory funnel containing ether (50 ml.), water (25 ml.), ice (25 ml.) and sodium hydroxide (1.0 g.). The layers are separated, the water layer extracted with ether (2 × 40 ml.), the ethereal extracts washed with water and saturated salt solution and dried (MgSO$_4$). The ethereal extract is concentrated to dryness and the residue crystallized from ethyl acetate-n-hexane to yield the subject compound.

EXAMPLE 17

Ammonium cis-5-allyloxy-2-methyl-1-(4'-methyl-sulfinylbenzylidene)-3-indenylthioacetate To cis-5-allyloxy-2-methyl-1-(4'-methylsulfinylbenzylidene)-3-indenylthioacetic acid (0.001 mole) in methanol (10 ml.) is added methanolic ammonia (1 N, 1 ml.). The mixture is evaporated to dryness to yield the subject compound.

EXAMPLE 18

Calcium cis-5-fluoro-2-methyl-1-(4'-methylsulfinyl-benzylidene)-3-indenyloxyacetate To a slurry of cis-5-fluoro-2-methyl-1-(4'-methylsulfinylbenzylidene)-3-indenyloxyacetic acid (0.002 mole) in water (10 ml.) is added hydrated calcium oxide (0.076 g., 0.001 mole) and the mixture stirred for 15 minutes. The mixture is concentrated to dryness in vacuo, slurried with methanol (10 ml.) and again concentrated to dryness to yield the subject compound.

EXAMPLE 19

Aluminum cis-5-chloro-2-methyl-1-(4'-methyl-sulfinylbenzylidene)-3-indenyloxyacetate To a solution of aluminum tert-butoxide (0.246 g., 0.001 mole) in ether (50 ml.) is added cis-5-chloro-2-methyl - 1 - (4'-methylsulfinylbenzylidene)-3-indenyloxyacetic acid (0.003 mole) in pyridine (50 ml.) with stirring at 10°. The mixture is concentrated to dryness in vacuo to yield the subject compound.

EXAMPLE 20

Sodium cis-5-fluoro-2-methyl-1-(4'-methylsulfinyl-benzylidene)-3-indenyloxyacetate To cis-5-fluoro-2-methyl-1 - (4' - methylsulfinylbenzylidene)-3-indenylthioacetic acid (0.001 mole) in methanol is added methanolic sodium methoxide (0.1 N, 10 ml.). The mixture is concentrated to dryness in vacuo to yield the subject compound.

EXAMPLE 21

Methoxymethyl cis-5-allyloxy-2-methyl-1-(p-methyl-sulfinylbenzylidene)-3-indenyloxyacetate Chloromethyl methyl ether (0.055 mole) is added to a suspension of cis-5-allyloxy-2-methyl-1-(p-methylsulfinly-benzylidene)-3-indenyloxyacetic acid (0.05 mole) and anhydrous potassium carbonate (0.15 mole) in 250 ml. of anhydrous acetone. The mixture is allowed to stir overnight at room temperature. Diethyl ether is added (about 200 ml.) and the mixture is filtered. The filtrate is washed once with 100 ml. of water and dried over anhydrous sodium sulfate. It is then filtered and the solvent is removed in vacuo. The residue is chromatographed on 200 g. of acid-washed alumina, using ether-petroleum ether (varying from 10 to 60% ether by volume) as the eluent, to give methoxymethyl cis-5-allyloxy-2-methyl-1-(p-methylsulfinylbenzylidene)-3-indenyloxyacetate.

EXAMPLE 22

β-Diethylaminoethyl cis-5-allyloxy-2-methyl-1-(p-methylsulfinylbenzylidene)-3-indenyloxyacetate A solution of 0.0054 mole of N,N'-dicyclohexylcarbodi-imide in 6 ml. of anhydrous tetrahydrofuran is added to a solution of cis-5-allyloxy-2-methyl-1-(p-methylsulfinyl-benzylidene)-3-indenyloxyacetic acid (0.005 mole) and 2-diethylaminoethanol (0.0054 mole) in 17 ml. of anhydrous tetrahydrofuran. The mixture is stirred at ambient temperature overnight. The dicyclohexylurea is removed by filtration and 2 ml. of glacial acetic acid is added to the filtrate. After the mixture has stood for one hour, it is filtered and 200 ml. of ether is added to the filtrate. The solution is then extracted three times with 100 ml. of 2.5 N HCl and the extracts are combined, washed twice with 100 ml. of water to remove traces of starting amine, dried over anhydrous potassium carbonate, filtered, and evaporated in vacuo. The oily residue is β-diethyl-aminoethyl cis-5-allyloxy-2-methyl - 1 - (p-methylsulfinyl-benzylidene)-3-indenyloxyacetate.

When 2-dimethylaminoethanol, 3-dimethylamino-1-pro-panol, 3-diethylamino-1-propanol, N-β-hydroxyethylpi-peridine, N-β-hydroxyethylpyrrolidine, N-hydroxymethyl-pyrrolidine, N-methyl - 2 - hydroxymethylpyrrolidine, N-ethyl - 2 - hydroxymethyl-piperidine, 1-β-hydroxyethyl-4'-methylpiperazine, or N-β-hydroxyethyl morpholine is used in the above procedure in place of 2-diethylaminoethanol, the corresponding β-dimethylaminoethyl, γ - dimethyl-aminopropyl, γ-diethylaminopropyl, β-N-piperidinylethyl, β-N-pyrrolidinylethyl, N-pyrrolidinylmethyl, α'-(1'-meth-ylpyrrolidinylmethyl), 4 - methyl-1-piperazinylethyl, N-ethyl-2-piperidinylethyl and N-morpholinylethyl esters are obtained.

What is claimed is:

1. A compound of the formula

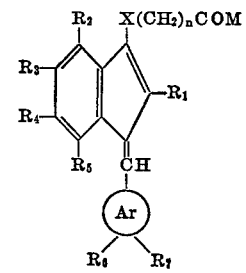

wherein
$R_1$ is hydrogen or loweralkyl;
$R_2$ and $R_5$ are hydrogen;
$R_3$ and $R_4$ are each hydrogen, halogen, loweralkoxy, or loweralkenyloxy;
$R_6$ is hydrogen, halogen, hydroxy, loweralkoxy;
$R_7$ is loweralkylsulfinyl;
Ar is phenyl;
X is —O—;
$n$ is 1 or 2; and
M is hydroxy, loweralkoxy, loweralkoxy-loweralkoxy, diloweralkylamino-loweralkoxy or OMe wherein Me is the cation of a pharmaceutically acceptable salt.

2. The cis and trans isomers of a compound of claim 1.

3. A compound of claim 1 wherein
X is O;
$n$ is 1;
$R_1$ is methyl;
$R_2$, $R_4$, $R_5$ and $R_6$ are each hydrogen;
$R_3$ is fluoro;
$R_7$ is methylsulfinyl; and
M is hydroxy.

4. The compound of claim 1 wherein
X is O;
$n$ is 1;
$R_1$ is methyl;
$R_2$, $R_5$ and $R_6$ are each hydrogen;
$R_3$ and $R_4$ are each fluoro;
$R_7$ is methylsulfinyl; and
M is hydroxy.

5. A compound as in claim 1 wherein
X is O;
$n$ is 1;
$R_2$ is hydrogen;
$R_1$ is methyl;
$R_3$ is hydrogen;
$R_4$ is fluoro;
$R_5$ and $R_6$ are hydrogen;
$R_7$ is methylsulfinyl; and
M is hydroxy.

6. A compound as in claim 1 wherein
X is O;
$n$ is 1;

$R_2$ is hydrogen;
$R_1$ is methyl;
$R_3$ is hydrogen;
$R_4$ is chloro;
$R_5$ and $R_6$ are hydrogen;
$R_7$ is methylsulfinyl; and
M is hydroxy.

7. A compound as in claim 1 wherein
X is O;
$n$ is 2;
$R_2$ is hydrogen;
$R_1$ is methyl;
$R_3$ is hydrogen;
$R_4$ is fluoro;
$R_5$ and $R_6$ are hydrogen;
$R_7$ is methylsulfinyl; and
M is hydroxy.

References Cited
UNITED STATES PATENTS
3,312,730  4/1967  Winters et al. ----- 260—470 X

FOREIGN PATENTS
1,178,658  1/1970  England ------------ 260—520

OTHER REFERENCES
Roberts et al., "Basic Principles of Organic Chemistry," W. A. Benjamin Inc., New York, N.Y. (1965), p. 758.

LORRAINE A. WEINBERGER, Primary Examiner

J. F. TERAPANE, Assistant Examiner

U.S. Cl. X.R.

260—247.1, 268 C, 293.62, 326.3, 326.5 S, 340.9, 448, 465 R, 465 S, 470, 516, 518 A, 519, 558 S, 559 T, 590, 600, 609 E